(12) United States Patent
Hirota et al.

(10) Patent No.: US 10,681,242 B2
(45) Date of Patent: Jun. 9, 2020

(54) DOCUMENT MANAGEMENT SYSTEM INCLUDING IMAGE PROCESSING SERVER AND DOCUMENT MANAGEMENT SERVER, AND DOCUMENT MANAGEMENT SERVER THAT TRANSMITS A CREATED CHANGE NOTIFICATION AT A TRANSMISSION TIMING BASED ON A NOTIFICATION PRIORITY

(71) Applicant: KYOCERA Document Solutions Inc., Osaka (JP)

(72) Inventors: Masato Hirota, Osaka (JP); Takashi Oguma, Osaka (JP); Toru Yasui, Osaka (JP); Toshitsugu Nishimi, Osaka (JP); Chikara Yuki, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 16/156,402

(22) Filed: Oct. 10, 2018

(65) Prior Publication Data
US 2019/0132475 A1 May 2, 2019

(30) Foreign Application Priority Data
Oct. 31, 2017 (JP) .................... 2017-210192

(51) Int. Cl.
*H04N 1/32* (2006.01)
*H04N 1/327* (2006.01)
*H04N 1/00* (2006.01)

(52) U.S. Cl.
CPC ..... *H04N 1/32101* (2013.01); *H04N 1/00331* (2013.01); *H04N 1/00923* (2013.01);
(Continued)

(58) Field of Classification Search
CPC .......... H04N 1/32101; H04N 1/00331; H04N 1/00923; H04N 1/32745; H04N 2201/3228; H04N 2201/3202
(Continued)

(56) References Cited

U.S. PATENT DOCUMENTS

2008/0250034 A1* 10/2008 Petri ...................... G06F 16/48
2012/0179718 A1* 7/2012 Matsumoto ........... G06F 17/212
707/772

FOREIGN PATENT DOCUMENTS

JP  2009-193164 A  8/2009

* cited by examiner

*Primary Examiner* — Jamares Q Washington
(74) *Attorney, Agent, or Firm* — Hawaii Patent Services; Nathaniel K. Fedde; Kenton N. Fedde (57) ABSTRACT

Provided is a document-management server that controls the amount of change notifications sent to an administrator of an image-processing server in the case where metadata necessary for system cooperation is changed. The image-processing server acquires an attribute of specific metadata from document data and transmits the attribute together with the document data. The document-management server manages the document data based on the attribute of the specific metadata transmitted from the image-processing server. A metadata-setting-receiving unit receives a change in the specific metadata. A notification-priority-adding unit adds a notification priority to the specific metadata for which a change is received by the metadata-setting-receiving unit. A change-notifying unit creates a change notification for informing that the specific metadata has been changed, and transmits the created change notification to an administrator of the image-processing server at a transmission timing based on the notification priority.

11 Claims, 5 Drawing Sheets

(52) U.S. Cl.
 CPC ......... *H04N 1/324* (2013.01); *H04N 1/32745* (2013.01); *H04N 2201/3202* (2013.01); *H04N 2201/3228* (2013.01)

(58) Field of Classification Search
 USPC .............................. 358/1.15, 3.28, 1.11, 1.16
 See application file for complete search history.

| METADATA NAME | DEFINITION |
|---|---|
| METADATA A | AAA |
| METADATA C | CCC |

| METADATA NAME | DEFFINITION | SYNCHRONIZATION INFORMATION | NOTIFICATION PRIORITY |
|---|---|---|---|
| METADATA A | AAA | SYNCHRONIZATION TARGET | REQUIRED |
| METADATA B | BBB | | OPTION |
| METADATA C | CCC | SYNCHRONIZATION TARGET | OPTION |
| METADATA D | DDD | | REQUIRED |

| CHANGE NOTIFICATION ID | METADATA NAME | CHANGE CONTENTS | NOTIFICATION PRIORITY | CONFIRMATION-COMPLETED FLAG |
|---|---|---|---|---|
| 001 | METADATA A | ○○○ | REQUIRED | COMPLETED |
| 003 | METADATA C | ××× | OPTION | NOT COMPLETED |

FIG.5

DOCUMENT MANAGEMENT SYSTEM INCLUDING IMAGE PROCESSING SERVER AND DOCUMENT MANAGEMENT SERVER, AND DOCUMENT MANAGEMENT SERVER THAT TRANSMITS A CREATED CHANGE NOTIFICATION AT A TRANSMISSION TIMING BASED ON A NOTIFICATION PRIORITY

INCORPORATION BY REFERENCE

This application is based on and claims the benefit of priority from Japanese Patent Application No. 2017-210192 filed on Oct. 31, 2017, the contents of which are hereby incorporated by reference.

BACKGROUND

The present disclosure relates to a document management system including an image processing server and a document management server, and a document management server.

Techniques for managing documents using metadata such as creation date, author, and the like are known.

SUMMARY

The document management system according to the present disclosure is a document management system including an image-processing server that acquires an attribute of specific metadata from document data and transmits the attribute together with the document data, and a document-management server that manages the document data based on the attribute of the specific metadata transmitted from the image-processing server. The document-management server includes a metadata-setting-receiving unit, a notification-priority-adding unit, and a change-notifying unit. The metadata-setting-receiving unit receives a change in the specific metadata. The notification-priority-adding unit adds a notification priority to the specific metadata for which a change is received by the metadata-setting-receiving unit. The change-notifying unit creates a change notification for informing that the specific metadata has been changed, and transmits the created change notification to an administrator of the image-processing server at a transmission timing based on the notification priority.

The document-management server according to the present disclosure is a document-management server that manages document data transmitted from an image-processing server based on an attribute of specific metadata acquired from the document data by the image-processing server. The document-management server includes a metadata-setting-receiving unit, a notification-priority-adding unit, and a change-notifying unit. The metadata-setting-receiving unit receives a change in the specific metadata. The notification-priority-adding unit adds a notification priority to the specific metadata for which a change is received by the metadata-setting-receiving unit. The change-notifying unit creates a change notification for informing that the specific metadata has been changed, and transmits the created change notification to an administrator of the image-processing server at a transmission timing based on the notification priority.

DETAILED DESCRIPTION

In the following, embodiments according to the present disclosure will be explained in detail with reference to the drawings. In the following embodiments, the same reference numerals are given to the configurations having similar functions.

Figure 1:
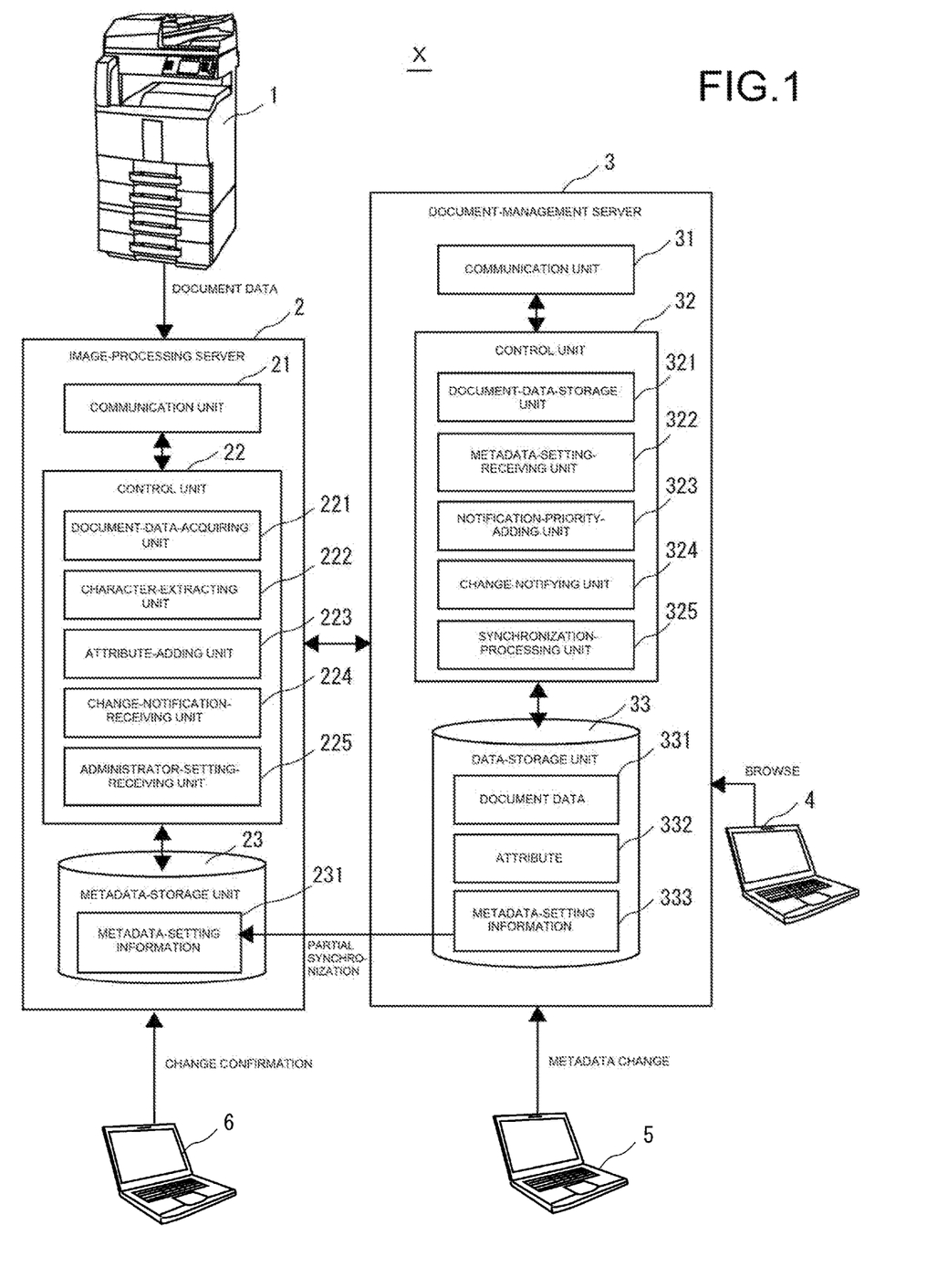
FIG. 1 is a system configuration diagram of a document management system of an embodiment according the present disclosure.

As illustrated in FIG. 1, in the document management system X of the present embodiment, an image forming apparatus 1, an image-processing server 2, a document-management server 3, a client terminal 4, an administrator terminal 5 used by an administrator of the document-management server 3, and an administrator terminal 6 used by an administrator of the image-processing server 2 are connected via a network such as a Local Area Network (LAN), the Internet, or the like. The image forming apparatus 1, the image-processing server 2, and the document-management server 3 may each function as a Web server. The client terminal 4 and the administrator terminals 5, 6 are each information-processing apparatuses such as a personal computer, a tablet terminal, and the like.

The image forming apparatus 1 is a copying machine, a multifunction peripheral, or the like that scans documents such as forms, invoices, and the like, generates document data 331, and transmits the generated document data 331 to the image-processing server 2. The image forming apparatus 1 may use image data generated by scanning as document data 331. The image forming apparatus 1 may convert the image data generated by scanning into a PDF file as the document data 331.

After generating document data 331, the image forming apparatus 1 may display a preview of the document data 331 on an operation panel and cause the user, via the operation panel, to select whether the document data 331 will be a management target of the document-management server 3. Then, when the document data 331 is selected to be managed by the document-management server 3, the image forming apparatus 1 may transmit the document data 331 to the image-processing server 2.

The image processing server 2 includes a communication unit 21, a control unit 22, and a metadata-storage unit 23.

The communication unit 21 has a function of transmitting and receiving various data to and from the image forming apparatus 1, the document-management server 3, and the administrator terminal 6 via a network such as a LAN, the Internet, or the like.

The control unit 22 is an information-processing unit such as a microcomputer or the like that includes a central processing unit (CPU), a read only memory (ROM), a random access memory (RAM), and the like. The ROM stores a control program for performing operation control of the image-processing server 2. The CPU of the control unit 22 reads the control program stored in the ROM and develops the control program in the RAM, thereby controlling the entire server.

In addition, the control unit 22 functions as a document-data-acquiring unit 221, a character-extracting unit 222, an attribute-adding unit 223, a change-notification-receiving unit 224, and an administrator-setting-receiving unit 225.

The document-data-acquiring unit 221 acquires the document data 331 from the image forming apparatus 1 received by the communication unit 21 as a management target of the document-management server 3.

The character-extracting unit 222 executes an optical character recognition (OCR) process on the document data 331 acquired by the document-data-acquiring unit 221, and extracts a character string from the document data 331. The character-extracting unit 222 may extract a character string by a zone OCR (area OCR) that is a character recognition target for a specific portion in the document data 331, and not the entire document data 331.

For example, the character-extracting unit 222 may extract a character string from the document data 331 using a template indicating an area to be the character recognition target. The template may be stored in the ROM, for example, and may be prepared for each type of document data 331 such as forms, invoices, and the like, for each company, or for each department. Moreover, when the document data 331 is transmitted from the image forming apparatus 1 to the image-processing server 2, the user may specify the type of template to be applied to the document data 331. Furthermore, the area of the template for the character recognition target may be correlated with metadata registered in metadata-setting information 231.

The attribute-adding unit 223 acquires the attribute 332 of the corresponding metadata name from the character string extracted by the character-extracting unit 222. This is based on the metadata-setting information 231 stored in the metadata-storage unit 23. The attribute-adding unit 223 adds the acquired attribute 332 to the document data 331, and transmits it to the document-management server 3 via the communication unit 21. Incidentally, the character-extracting unit 222 may give the character string extracted from the document data 331 to the attribute-adding unit 223 in a state of being cut in correspondence with the metadata registered in the metadata-setting information 231. In addition, the attribute-adding unit 223 may specify the corresponding metadata, or analyze the extracted character string by text mining or the like. This is based on the area where the character string is extracted from the document data 331 by the character-extracting unit 222. As a result, the metadata attribute 332 may be obtained from the character string by specifying the corresponding metadata.

Figure 2:
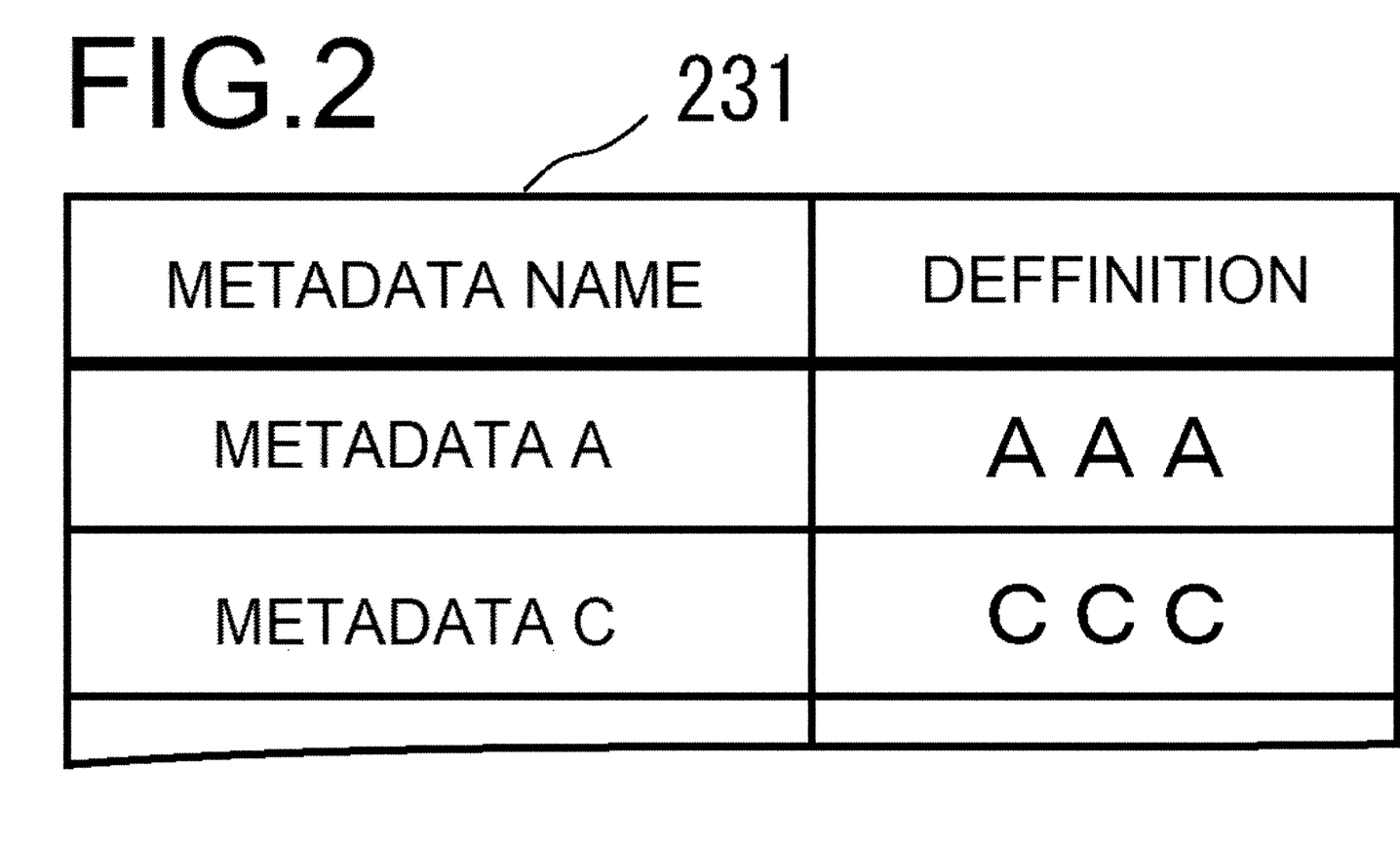
FIG. 2 illustrates an example of registering metadata illustrated in FIG. 1.

FIG. 2 illustrates an example of metadata registration in the metadata-setting information 231. The metadata includes a metadata name (the name of the attribute 332) and a definition of the attribute 332. The metadata name is the name of the attribute 332 to be transmitted to the document-management server 3, and is, for example, an address, an invoice number, or the like. In FIG. 2, metadata A and metadata C are illustrated. The definition indicates the respective data type, the input rule, and the like of metadata A and metadata C. The character string extracted by the character-extracting unit 222 is converted by the attribute-adding unit 223 according to the definition of the corresponding metadata name, and transmitted to the document-management server 3 as the attribute 332 of the document data 331. As a result, for example, the extracted character string "12345" is transmitted to the document-management server 3 as the attribute "12345" based on the definition "half-width numeric character" of the corresponding metadata name "invoice number".

Incidentally, the metadata registered in the metadata-setting information 231 is synchronized with part of the metadata of the document-management server 3 to be described later, and is kept the same. This is because, in the case where there is inconsistency in the data type or the input rule of the attribute 332 to be the transmission target, the attribute 332 cannot be received by the document-management server 3, resulting in a transmission error.

The change-notification-receiving unit 224 receives a change notification from the document-management server 3 via the communication unit 21 notifying that the metadata to be synchronized has been changed. Details of the change notification will be described later.

The administrator-setting-receiving unit 225 receives various settings from the administrator of the image-processing server 2 via the administrator terminal 6. For example, the administrator-setting-receiving unit 225 is able to provide setting information of the image-processing server 2 to the administrator terminal 6 so that the setting information can be browsed, and receive metadata settings necessary for system cooperation with the document-management server 3.

The metadata-storage unit 23 is a storage unit such as a semiconductor memory, hard disk drive (HDD), or the like, and in addition to various setting information, stores metadata necessary for system cooperation with the document-management server 3.

The document-management server 3 includes a communication unit 31, a control unit 32, and a data-storage unit 33.

The communication unit 31 has a function of transmitting and receiving various data between the image-processing server 2, the administrator terminal 5 and the administrator terminal 6 via a network such as a LAN, the Internet, or the like.

The control unit 32 is an information-processing unit such as a microcomputer or the like that includes a CPU, a ROM, a RAM and the like. The ROM stores a control program for controlling the operation of the document-management server 3. The CPU of the control unit 32 reads the control program stored in the ROM and develops the control program in the RAM, thereby controlling the entire server.

In addition, the control unit 32 functions as a document-data-storage unit 321, a synchronization-processing unit 325, a metadata-setting-receiving unit 322, a notification-priority-adding unit 323, and a change-notifying unit 324.

The document-data-storage unit 321 stores the document data 331 transmitted from the image-processing server 2 and the attribute 332 of the document data 331 in the data-storage unit 33. Moreover, in the case where there is a browsing request from the client terminal 4, the document-data-storage unit 321 provides the document data 331 stored in the data-storage unit 33 and the attribute 332 of the document data 331 to the client terminal 4 so as to be browsable. For example, the document-data-storage unit 321 can search the document data 331 corresponding to the attribute 332 specified from the client terminal 4, and allow the client terminal 4 to browse the corresponding document data 331.

The metadata-setting-receiving unit 322 receives changes such as a new addition, deletion, editing, and the like of metadata from the administrator of the document-management server 3 via the administrator terminal 5 of the document-management server 3, and reflects the changes in the metadata-setting information 333. For example, the metadata is changed in the case where required items of an invoice are changed due to a revision of the law or the like, or in the case when requested by the customer, and the like. Incidentally, the metadata-setting-receiving unit 322 may reflect the changes of the metadata in the metadata-setting information 333 after the administrator confirms a later-described change notification informing that the metadata has been changed.

Figure 3:
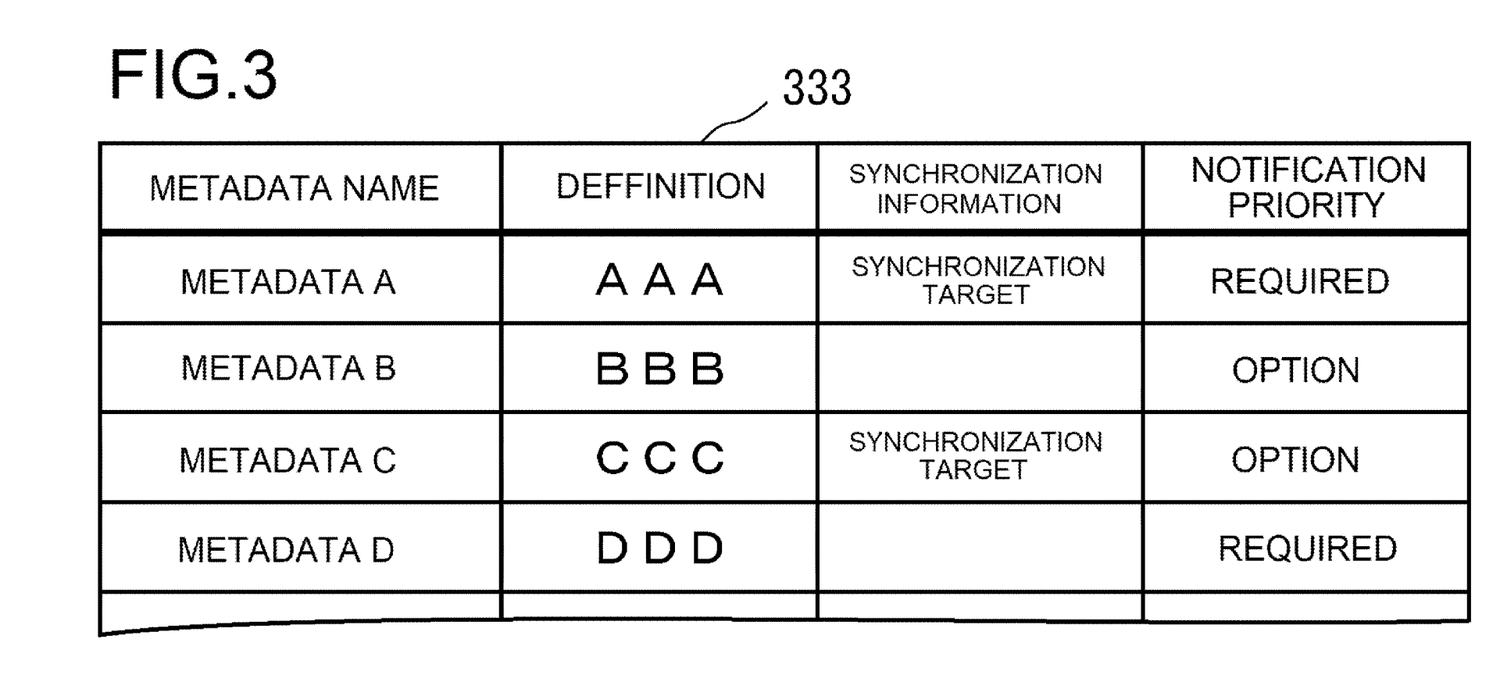
FIG. 3 illustrates an example of registering metadata illustrated in FIG. 1.

FIG. 3 illustrates an example of metadata registration in the metadata-setting information 333. For each metadata, the metadata-setting information 333 registers a metadata name, which is the name of the attribute 332, a definition of the attribute 332, synchronization information indicating whether or not to set as a target of synchronization with the image-processing server 2, and the notification priority of the change notification for the metadata.

In the case of synchronizing with the metadata of the image-processing server 2, "synchronization target" is set as the synchronization information, and when not synchronized, this is left blank. The metadata set as the synchronization target becomes the synchronization source in the synchronization process. In the case where this metadata is changed, the priority of the transmission timing of the change notification performed by the change-notifying unit 324 described later is set in the notification priority. The notification priority is added to the metadata by the notification-priority-adding unit 323. In FIG. 3, two types of notification priorities are indicated as "required" and "option". In the case of "required", a change notification is sent immediately. In the case of "option", a change notice is sent at a specified timing. In the case of "option", the transmission timing of the change notification may be set to be, for example, a specific time, a specific date, or a specific day of the week. Note that the notification priority is not limited to "required" and "option", and there may be a plurality of levels such as "high", "medium", and "low". In addition, the priority may be expressed by a weighting, and a larger weight value may be added as the notification priority increases.

The notification-priority-adding unit 323 adds the notification priority of change notification for each metadata. For example, in system cooperation with the document-management server 3 or the image-processing server 2, the notification-priority-adding unit 323 may add high notification priority to metadata commonly used by a plurality of modules. Low notification priority may be added to metadata used by a single module. For example, the notification-priority-adding unit 323 may search for a module having metadata as an argument and add a higher notification priority as the number of corresponding modules increases. In other words, in the case where the metadata is changed, the higher the degree of influence on the system is, the higher the notification priority may be set. In addition, the notification-priority-adding unit 323 may add the notification priority set by the administrator of the document-management server 3 to the metadata. Moreover, the notification-priority-adding unit 323 may add notification priority in the case where new metadata is added by the metadata-setting-receiving unit 322, or may add notification priority again each time metadata is changed.

When the metadata is changed by the metadata-setting-receiving unit 322, the change-notifying unit 324 creates a change notification indicating the changed contents of the metadata, and transmits the change notification to a pre-registered transmission destination by e-mail or the like, for example. For example, when the metadata set to be the target of synchronization with the image-processing server 2 is changed, the change-notifying unit 324 transmits a change notification to the image-processing server 2. The change notification transmitted to the image-processing server 2 is received by the change-notification-receiving unit 224 via the communication unit 21, and can be confirmed by the administrator of the image-processing server 2 via the administrator terminal 6. Incidentally, in the case where metadata that is not set as a target of synchronization with the image-processing server 2 is changed, the change-notifying unit 324 does not need to transmit the change notification to the administrator of the document-management server 3. This is because the change is a change performed by the administrator of the document-management server 3.

In addition, the change-notifying unit 324 controls the transmission timing of the change notification based on the notification priority added to the metadata. For example, in the case where the notification priority is high, the change-notifying unit 324 immediately transmits the created change notification, and in the case where the notification priority is low, the change-notifying unit 324 puts the transmission of the created change notification on hold, and transmits that change notification at a specific timing such as a specified time, a specified date, or a specified day of the week. Moreover, the change-notifying unit 324 may transmit the change notification instantly and more frequently as the notification priority increases. Furthermore, the change-notifying unit 324 may delay the notification timing of the change notification and transmit the notification less frequently as the notification priority decreases. Therefore, even in the case where a large amount of metadata is changed, a change notification with a high notification priority is transmitted in preference to a change notification with a low notification priority, so it is possible to reduce the number of change notifications and the frequency of transmitting change notifications to be notified to the administrator. In addition, the change-notifying unit 324 may change the notifying format style so that it can be understood that a change notification with a high notification priority is for a more important change than a change notification with a low notification priority. For example, the change-notifying unit 324, in the case of a change notice with a high notification priority, adds the word "important" to the subject (title), changes the color of the subject, or adds a flag indicating importance.

Moreover, a confirmation button may be provided for the change notification, and by pressing the confirmation button, a confirmation-completed notification indicating that the administrator has confirmed the change notification is transmitted to the document-management server 3. The confirmation button may be a hyperlink which connects to the document-management server 3 by being clicked on.

Figure 4:
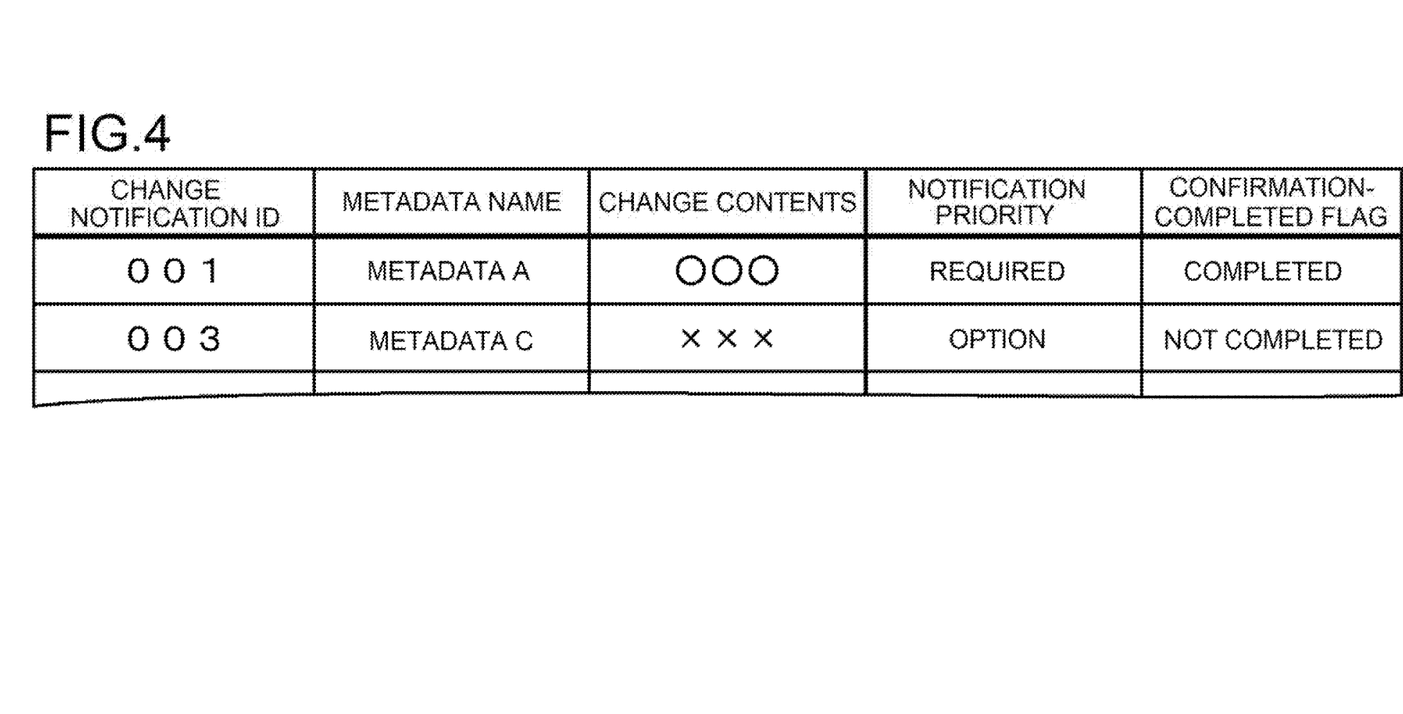
FIG. 4 is an example of managing a change notification by the change-notifying unit illustrated in FIG. 1.

As illustrated in FIG. 4, the change-notifying unit 324 may manage the created change notification with a change-notification ID for identifying the change notification, the changed metadata name, the changed contents, the notification priority, and a confirmation-completed flag. The confirmation-completed flag is information indicating whether or not the confirmation-completed notification has been transmitted. In the case where a confirmation-completed notification has been transmitted, the confirmation-complete flag is set to "completed", and in the case where a confirmation-completed notification has not been transmitted, the confirmation-complete flag is set to "not completed". The change-notifying unit 324 may repeatedly transmit the change notification at a notification timing based on the notification priority while the confirmation-completed flag is "not completed". In the case where the confirmation-completed notification is transmitted by the administrator pressing the change notification confirmation button, the change-notifying unit 324 may change the confirmation-completed flag to "completed" and may end the transmission of this change notification. As a result, since the same change notification is repeatedly transmitted at the notification timing based on the notification priority until the administrator confirms the change notification, the administrator can confirm the change notification based on the notification priority; and it is also possible to prevent the administrator from forgetting to confirm the change notification.

The synchronization-processing unit 325 transmits the metadata (for example, defined as a metadata name) of the metadata stored in the data-storage unit 33 that is set as a target of synchronization to the image-processing server 2, and synchronizes that metadata with the metadata stored in the metadata-storage unit 23 of the image-processing server 2. The synchronization process may be performed, for example, immediately, once every hour, once a day, at a specific timing specified by an administrator, or the like. Moreover, in the case where the metadata to be synchronized is changed by the metadata-setting-receiving unit 322, the synchronization-processing unit 325 does not need to perform the synchronization process until the change contents are confirmed by the administrator of the image-processing server 2. For example, the synchronization-processing unit 325 may execute the synchronization process of this metadata when the change notification confirmation button for the changed metadata is pressed and the confirmation-completed notification is transmitted.

Figure 5:
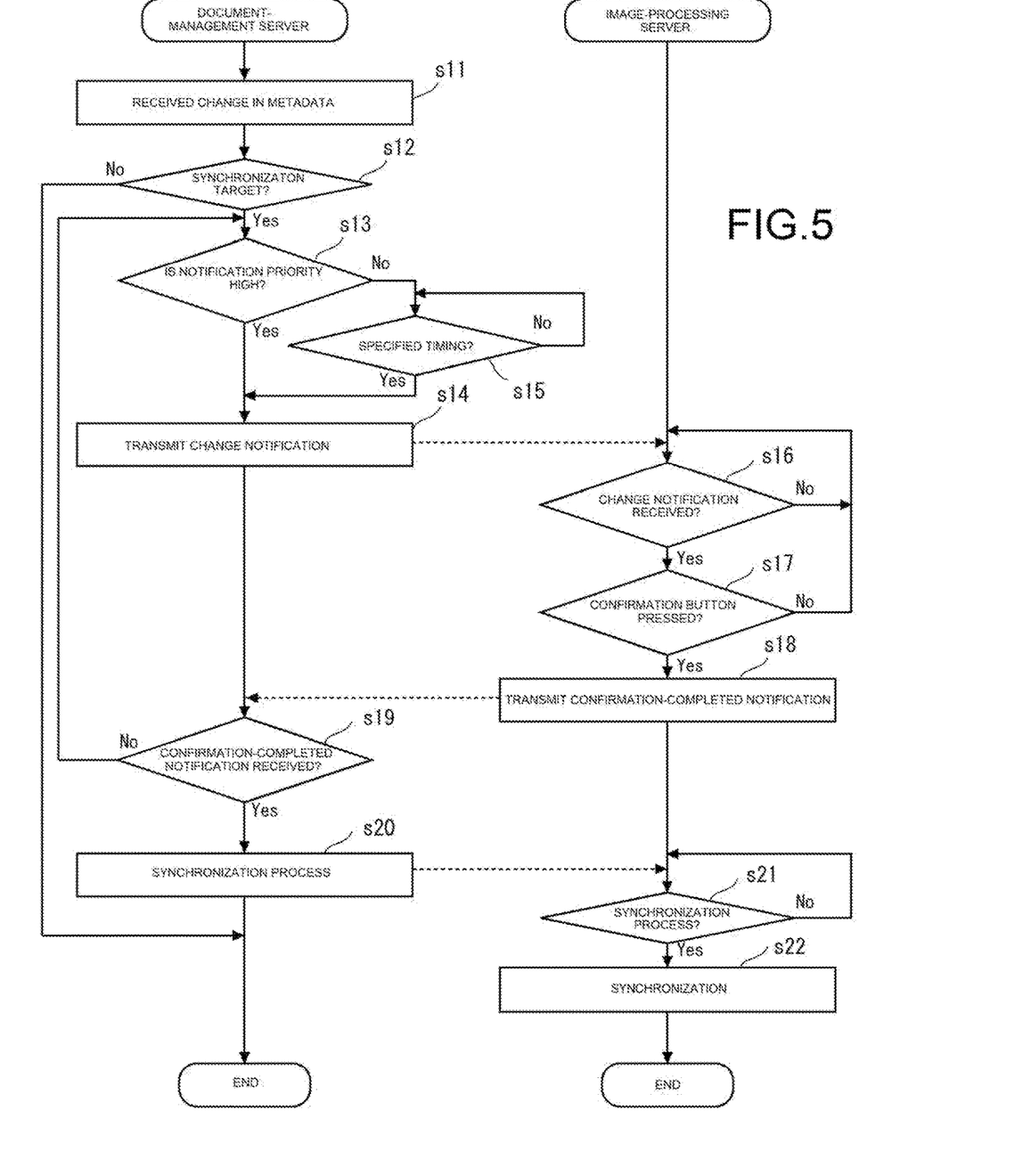
FIG. 5 is a flowchart showing the flow of a metadata change process by the document management system illustrated in FIG. 1.

Next, with reference to FIG. 5, the flow of the metadata change process in the case where the metadata of the document-management server 3 is changed will be described. Incidentally, in the following description, the case of transmitting a change notification in the case where the metadata of the image-processing server 2 and the metadata that is the target of synchronization are changed will be explained as an example.

When the metadata-setting-receiving unit 322 of the document-management server 3 receives a change of the metadata (S11), the change-notifying unit 324 determines whether or not the changed metadata is set as a target of synchronization with the image-processing server 2 (S12). When changed metadata is not set as a synchronization target (S12: NO), the present process is terminated.

When the changed metadata is set as a synchronization target (S12: YES), the change-notifying unit 324 determines whether the notification priority is high (S13). For example, when the notification priority is "required", the change-notifying unit 324 determines that the notification priority is high (S13: YES), and immediately sends a change notification to the image-processing server 2 (S14). On the other hand, in the case where the notification priority is, for example, "option", the change-notifying unit 324 determines that the notification priority is not high (S13: NO), and without immediately transmitting the change notification, waits until the specific timing (S15, S15: NO). Therefore, the transmission of the change notification is put on hold. When the specified timing is reached (S15: YES), the change-notifying unit 324 transmits the pending change notification to the image-processing server 2 (S14).

The change-notification-receiving unit 224 of the image-processing server 2 is on standby until receiving a change notification from the document-management server 3 via the communication unit 21 (S16, S16: NO). After receiving the change notification (S16: YES), the change-notification-receiving unit 224 determines whether or not the confirmation button provided in the change notification has been pressed (S17). The change notification can be viewed by the administrator of the image-management server, and may be transmitted to the e-mail address of the administrator of the image-processing server 2, for example.

When the confirmation button is pressed (S17: YES), the control unit 22 of the image-processing server 2 transmits a confirmation-completed notification to the document-management server 3 (S18). Incidentally, the change notification may be transferred from the image-processing server 2 to the administrator terminal 6. In this case, when the administrator presses the confirmation button, the confirmation-completed notification may be transmitted from the administrator terminal 6. In the case where the confirmation button is not pressed (S17: NO), the process returns to S16.

The change-notifying unit 324 of the document-management server 3 determines whether or not the communication unit 31 has received the confirmation-completed notification for the transmitted change notification (S19), and in the case where the confirmation-completed notification has not been received (S19: NO), the process returns to S13. Therefore, change notifications are repeatedly transmitted at notification timing based on the notification priority until a confirmation-completed notification is received (S13 to S19).

When the change-notifying unit 324 receives the confirmation-completed notification via the communication unit 31 (S19: YES), the synchronization-processing unit 325 executes the synchronization process on the changed metadata (S20). The synchronization process may be executed with metadata corresponding to the confirmation-completed notification as a target, or may be executed at the synchronization timing with other synchronization target metadata, together. The control unit 22 of the image-processing server 2 determines whether the synchronization-processing unit 325 has executed the metadata synchronization process (S21), and when not executed (S21: NO), the control unit 22 returns the process to S21. When the synchronization process is executed (S21: YES), the control unit 22 synchronizes the metadata transmitted from the synchronization-processing unit 325 by overwriting the metadata registered in the metadata-setting information 231 (S22), then this process ends.

As described above, the document management system X according to the present embodiment is a document management system X that includes: an image-processing server 2 that acquires an attribute 332 of the specific metadata from document data 331 and transmits the attribute 332 together with the document data 331; and a document management server 3 that manages the document data 331 based on the attribute 332 of the specific metadata transmitted from the image-processing server 2; wherein the document-management server 3 includes a metadata-setting-receiving unit 322 for receiving a change of specific metadata; a notification-priority-adding unit 323 for adding notification priority to the specific metadata for which a change is received by the metadata-setting-receiving unit 322; and a change-notifying unit 324 that creates a change notification informing that the specific metadata has been changed, and transmits the created change notification to an administrator of the image-processing server 2 at a transmission timing based on the notification priority. As a result, the change-notifying unit transmits a change notification to the administrator by controlling the transmission timing of the change notification based on the notification priority, so it is possible to reduce the amount of change notifications sent to the administrator at a time. Therefore, it is possible to reduce the burden on the administrator of the image-processing server.

In a typical technique, a case is explained in which a document-management server that manages document data together with document metadata, and an image-processing server that extracts metadata necessary for the document-management server from document data are linked by a system. In this case, the image-processing server stores the same metadata as a part of the metadata stored in the document-management server so that necessary metadata can be transmitted to the document-management server. This metadata is set as a synchronization target in the document-management server, and it is synchronized with the metadata of the image-processing server at a specified timing.

In the document-management server, in the case where the metadata that is the target of synchronization is changed, a change notification for notifying of the change contents is transmitted to the administrator of the image-processing server. The administrator of the image-processing server, based on this change notification, performs settings and confirmation for the image-processing server that are necessary for system cooperation with the document-management server.

However, in this typical technique, in the case where there is a large amount of metadata as a synchronization target in the document-management server, there is a problem in that every time the metadata is changed, a large amount of change notifications are sent to the administrator of the image-processing server at one time, which is a burden on the administrator.

Taking into consideration the problems described above, the object of the present disclosure is to provide a technique capable of controlling the amount of change notifications sent to an administrator of an image-processing server in the case where metadata necessary for system cooperation is changed in a document-management server.

According to the present disclosure, it is possible to control the amount of change notifications transmitted to the administrator of an image-processing server when the metadata necessary for system cooperation is changed in the document management server.

The technique according to present disclosure is not limited to the above-described embodiments, and it goes without saying that various modifications can be made without departing from the gist of the present disclosure.

What is claimed is:

1. A document management system comprising an image-processing server that acquires an attribute of specific metadata from document data and transmits the attribute together with the document data, and a document-management server that manages the document data based on the attribute of the specific metadata transmitted from the image-processing server; wherein the document-management server comprises:
    a metadata-setting-receiving unit that receives a change in the specific metadata;
    a notification-priority-adding unit for adding a notification priority to the specific metadata for which a change is received by the metadata-setting-receiving unit; and
    a change-notifying unit that creates a change notification for informing that the specific metadata has been changed, and transmits the created change notification to an administrator of the image-processing server at a transmission timing based on the notification priority; and
    wherein the change-notifying unit
    advances the transmission timing of the change notification as the notification priority added to the specific metadata for which a change is received becomes higher, and delays the transmission timing of the change notification as the notification priority added to the specific metadata for which a change is received becomes lower.

2. A document management system comprising an image-processing server that acquires an attribute of specific metadata from document data and transmits the attribute together with the document data, and a document-management server that manages the document data based on the attribute of the specific metadata transmitted from the image-processing server; wherein the document-management server comprises:
    a metadata-setting-receiving unit that receives a change in the specific metadata;
    a notification-priority-adding unit for adding a notification priority to the specific metadata for which a change is received by the metadata-setting-receiving unit; and
    a change-notifying unit that creates a change notification for informing that the specific metadata has been changed, and transmits the created change notification to an administrator of the image-processing server at a transmission timing based on the notification priority;
    wherein
    the change notification
    is provided with a confirmation button for transmitting a confirmation-completed notification to the document-management server; and
    the change-notifying unit
    repeatedly transmits the change notification at transmission timing based on the notification priority until the confirmation-completed notification is transmitted.

3. The document management system according to claim 1, wherein
    the change-notifying unit
    transmits the change notification at a lower frequency the lower the notification priority.

4. The document management system according to claim 1, wherein
    the notification-priority-adding unit
    adds a higher notification priority the larger degree of influence exerted by a change in the specific metadata.

5. The document management system according to claim 1, wherein
    the image-processing server has
    metadata-setting information in which the specific metadata is registered; and
    the document-management server comprises
    a synchronization-processing unit that synchronizes the specific metadata registered in the metadata-setting information with the specific metadata changed by the metadata-setting receiving unit as a synchronization source.

6. The document management system according to claim 1, wherein
    the image-processing server comprises:
    a character-extracting unit for extracting a character string by character recognition of the document data; and
    an attribute-adding unit that acquires the attribute of the specific metadata based on the character string extracted by the character-extracting unit and transmits the attribute together with the document data.

7. A document-management server that manages document data transmitted from an image-processing server based on an attribute of specific metadata acquired from the document data by the image-processing server, comprising:
    a metadata-setting-receiving unit that receives a change in the specific metadata;

a notification-priority-adding unit for adding a notification priority to the specific metadata for which a change is received by the metadata-setting-receiving unit; and a change-notifying unit that creates a change notification for informing that the specific metadata has been changed, and transmits the created change notification to an administrator of the image-processing server at a transmission timing based on the notification priority; wherein the change-notifying unit advances the transmission timing of the change notification as the notification priority added to the specific metadata for which a change is received becomes higher, and delays the transmission timing of the change notification as the notification priority added to the specific metadata for which a change is received becomes lower.

8. The document management system according to claim 2, wherein the change-notifying unit transmits the change notification at a lower frequency the lower the notification priority.

9. The document management system according to claim 2, wherein the notification-priority-adding unit adds a higher notification priority the larger degree of influence exerted by a change in the specific metadata.

10. The document management system according to claim 2, wherein the image-processing server has metadata-setting information in which the specific metadata is registered; and the document-management server comprises a synchronization-processing unit that synchronizes the specific metadata registered in the metadata-setting information with the specific metadata changed by the metadata-setting receiving unit as a synchronization source.

11. The document management system according to claim 2, wherein the image-processing server comprises:

a character-extracting unit for extracting a character string by character recognition of the document data; and an attribute-adding unit that acquires the attribute of the specific metadata based on the character string extracted by the character-extracting unit and transmits the attribute together with the document data.

* * * * *